United States Patent [19]

Eichenberger et al.

[11] 3,919,222

[45] Nov. 11, 1975

[54] PROCESS FOR PREPARING AN INTERMOLECULAR COMPOUND OF 2-METHYLTHIO-4-ETHYLAMINO-6-TERT.BUTYL-AMINO-S-TRIAZINE AND AN ASYMMETRICALLY SUBSTITUTED CHLOROTRIAZINE

[75] Inventors: Jürg Eichenberger, Munchenstein; Norbert Perlhefter, Allschwil; Pierre-André Bôle, Basel, all of Switzerland

[73] Assignee: Ciba-Geigy Corporation, Ardsley, N.Y.

[22] Filed: May 21, 1974

[21] Appl. No.: 472,021

Related U.S. Application Data

[62] Division of Ser. No. 166,605, July 27, 1971, Pat. No. 3,859,076.

[30] Foreign Application Priority Data

July 31, 1970   Switzerland................. 11591/70

[52] U.S. Cl.................. 260/249.8; 71/93

[51] Int. Cl.$^2$................. C07D 251/52
[58] Field of Search................. 260/249.8

[56] References Cited
UNITED STATES PATENTS
3,492,110    1/1970    Hood et al................. 260/249.8

*Primary Examiner*—John M. Ford
*Attorney, Agent, or Firm*—Frederick H. Rabin

[57] ABSTRACT

A stable, storable herbicidal agent is disclosed comprising in a finely divided state, in addition to solid additives, an intermolecular compound between a 2-alkylthio-4-alkylamino-6-butylamino-s-triazine and at least one 2-chloro-4,6-bis-amino-s-triazine differently substituted in the two amine groups and, optionally, in addition to the stated intermolecular compound one of its components in the free form in excess. Further disclosed are processes for the preparation of said herbicidal agent as well as said intermolecular compound, respectively.

7 Claims, No Drawings

PROCESS FOR PREPARING AN INTERMOLECULAR COMPOUND OF 2-METHYLTHIO-4-ETHYLAMINO-6-TERT.BUTYL-AMINO-S-TRIAZINE AND AN ASYMMETRICALLY SUBSTITUTED CHLOROTRIAZINE

This is a division of application Ser. No. 166,605, filed on July 27, 1971, now U.S. Pat. No. 3,859,076.

DESCRIPTION OF THE INVENTION

The present invention relates to stable, storable herbicidal agents, especially wetting powders, containing at least two different s-triazine derivatives as active substance components, as well as to processes for the production of these agents.

Selectively acting herbicidal combination products containing as active substances two or more different triazine derivatives are of particular interest with regard to their use as preemergence and postemergence herbicides for a series of plant cultivations. Thus, for example, a preferred group of products contains mixtures of alkylthio-bis-alkylamino-s-triazines with chloro-bis-amino-s-triazines. As known examples are mentioned the following combinations: atrazine/prometryne (2-chloro-4-ethylamino-6-isopropylamino-s-triazine + 2-methylthio-4,6-bis-isopropylamino-s-triazine), atrazine/ametryne (ametryne = 2-methylthio-4-ethylamino-6-isopropylamino-s-triazine), simazine/prometryne (simazine = 2-chloro-4,6-bis-ethylamino-s-triazine), as well as the combinations of simazine with 2-methylthio-4-isopropylamino-6-(γ-methoxypropylamino)-s-triazine.

Such combination products are usually made up in the form of dispersible powders or granulates, and also in the form of suspension concentrates (liquid pastes), these having a base of water or mineral oils, etc.. The obtained preparations prove to be chemically stable, and can be stored for an appreciable time at room temperature or at elevated temperature, without their physical properties changing in any significant manner, or their applicability becoming impaired.

The stated combination products are produced as usual by the mixing together of the pulverulent active substances with the conventional auxiliaries (wetting agents, dispersing agents, solid carriers, or inert liquid media, and also with additions of anticaking agents, antifoam agents, etc.); the homogeneous mixture is then finely ground in a suitable mill. One of the most important requirements which has to be satisfied in the case of a finished product is, in general, that the product must contain no coarse particles which would lead to a blockage of the nozzles used. The wet-sieve residue of the product on the 44 μ sieve must therefore not exceed 1 – 2%. The particle fineness of the active substances is moreover of decisive importance with respect to the suspension property of diluted suspensions, and can also affect the stability of the suspension concentrates. The wet-sieve residue on the 44 μ sieve and the particle fineness should therefore undergo the minimum possible change during storage of the product.

Whereas the above mentioned combination products satisfy these requirements, analogously formulated new combination products containing as alkylthiotriazine: 2-methylthio-4-ethylamino-6-tert.butylamino-s-triazine, and as chlorotriazine, e.g. 2-chloro-4-ethylamino-6-tert.butylamino-s-triazine or 2-chloro-4-ethylamino-6-sec.butylamino-s-triazine, or 2-chloro-4-ethylamino-6-isopropylamino-s-triazine (atrazine), or 2-(4-chloro-6-ethylamino-1,3,5-triazin-2-yl-amino)-2-methylpropionitrile, have surprisingly proved to be physically unstable. Such combinations or mixtures of two pulverulent active substances containing 5 – 98% of alkylthiotriazine and 95 – 2% of chlorotriazine can be processed, in a known manner, to obtain wettable powders (total active substance content = 15 to 95%, preferably 25 to 80%) or suspension concentrates (total active substance content = ca. 100 to 600 g/liter, preferably 200 to 500 g/liter). These preparations, however, have a completely inadequate storage stability. Already after a relatively short storage time (e.g. 6 – 12 months at room temperature, or e.g. 2 to 14 days' storage at 50°C), pronounced changes in the physical properties are, as a rule, observed, namely: The wettable powders become lumpy, agglomerate or frit, and can no longer be satisfactorily dispersed in water. Furthermore, the wet-sieve residue on the 44 μ sieve greatly increases and can attain a value of 20% or more after a storage time of only 1 week at 50°C. The smooth application of the preparations is no longer possible due to blockage of the spray nozzles, and moreover the suspension property of the particles in aqueous suspensions decreases appreciably. Suspension concentrates likewise lose their stability in consequence of sedimentation.

This physical instability of products containing 2-methylthio-4-ethylamino-6-tert.butylamino-s-triazine, in addition to certain 2-chloro-4,6-bis-amino-s-triazines substituted in the amino groups, is very surprising, since it is not caused either by a chemical decomposition (chemical reaction) or by a depression of the melting point of the active substance mixture.

This instability cannot be overcome by normal measures: it was not rectified either by a massive increase in the additions of anticaking agent from 10% to 50% in the wettable powder, or by the choice of other wetting agents, dispersing agents or emulsifiers. Stored wettable powders which had become lumpy were finely ground afresh, but after further storage there again occurred a severe deterioration of the physical properties. The instability persists also in the case of wettable powders from which the already formed lumps had been removed. This instability in storage cannot be eliminated even by the fusing together of the active substances, the allowing of the melt to crystallise by standing, the grinding of the solidified melt and the processing of the ground material into wettable powders.

Surprisingly, it has now been established that the reason for the mentioned instability is the slow formation of an intermolecular physical compound between the 2-methylthio-4-ethylamino-6-tert.butylamino-s-triazine (A) and the 2-chloro-s-triazine; and that the intermolecular compounds responsible for the instability form only between 2-chloro-4,6-bis-amino-s-triazines asymmetrically substituted in the two amino groups and (A), that is, with 2-chlorotriazines of which the two amino groups each contain a substituent differing from that of the other group.

The formation of the intermolecular compounds does not proceed during storage at the same rate for each of the above mentioned combinations, so that the extent to which storage instability is pronounced will depend on the specific combination of active substances. The mixtures agglomerate and become lumpy and lose their dispersibility in consequence, therefore, of the slowly occurring formation of the intermolecular compound during storage of the solid mixtures.

An examination of the washed and dried coarse fractions formed during storage of the combination products revealed that these coarse fractions consist of relatively coarse crystals which clearly differ, both with regard to their form and with regard to the X-ray spectra, from the crystals of the two active substances in the freshly prepared mixtures. Furthermore, a difference exists also in the melting points (decomposition points). It is therefore a case of well-defined molecular "inclusion compounds" having for the two active substance components a well-defined reciprocal quantitative proportion which, however, need not correspond to an integral simple molar ratio. It is to be supposed that the methylthio component (2-methylthio-4-ethylamino-6-tert.butylamino-s-triazine) forms the "cage" in the interior of which, with regard to the steric arrangement, is contained only a specific amount of the second component concerned (2-chloro-4,6-bis-amino-s-triazine asymmetrically substituted in the two amino groups) corresponding to the molecular volume of the cage. Also possible are intermolecular compounds in which two or more 2-chloro-4,6-bis-amino-s-triazines asymmetrically substituted in the two amino groups are enclosed in the interior ("cage") of the methylthio-butylamino-s-triazine component.

Independently of the original mixture ratio of the two components, crystals of the intermolecular compound are formed whereby the quantitative ratio between methylthiotriazine and chlorotriazine is always the same. Depending on the specifically chosen components, this quantitative ratio (methylthiotriazine : chlorotriazine) is between about 3:2 and 5.3:1 (verifiable by means of thin-layer chromatography and gas chromatography). In most cases the weight ratio is in the region of 4:1.

According to the invention, stable, storable, solid herbicidal agents are obtained by the mixing of a preformed intermolecular compound between a 2-alkylthio-4-alkylamino-6-butylamino-s-triazine and at least one 2-chloro-4,6-bis-amino-s-triazine differently substituted in the two amino groups, in a finely ground state with the other constituents of the agent.

The stable, storable herbicidal agent according to the invention is characterised in that it contains, in a finely divided form, in addition to the usual solid additives such as wetting agents, dispersing agents, carriers, etc., an intermolecular compound between a 2-alkylthio-4-alkylamino-6-butylamino-s-triazine and at least one 2-chloro-4,6-bis-amino-s-triazine differently substituted in the two amino groups.

The preferred alkylthio-s-triazine component of the intermolecular compound of the herbicidal agent is 2-methylthio-4-ethylamino-6-tert.butylamino-s-triazine, whilst suitable asymmetrical chlorotriazines, i.e. 2-chloro-4,6-bis-amino-s-triazines asymmetrically substituted in the two amino groups, are preferably such having at least one branched, optionally substituted alkyl radical in the amino groups, such as, e.g. 2-chloro-4-ethylamino-6-tert.butylamino-s-triazine, 2-chloro-4-ethylamino-6-sec.butylamino-s-triazine, 2-chloro-4-ethylamino-6-(2'-cyanopropyl-(2')-amino)-s-triazine, but also atrazine, etc.

The herbicidal activity of the active substance combinations in the form of finely ground intermolecular compounds differs scarcely at all from that of the active substance mixtures not physically bonded but of the same composition quantitatively.

If the herbicidal agent is to contain the active substance components in a reciprocal quantitative proportion not corresponding to the quantitative proportion obtaining in the intermolecular compound, then the one component in the unbonded form is added in excess. There is no risk of such a mixture being unstable, since for the excess component there is, of course, no reactant present in the free form with which the excess component could react during storage.

The intermolecular compounds which are formed by reaction of a 2-chloro-4,6-bis-amino-s-triazine asymmetrically substituted in the two amino groups with 2-methylthio-4-ethylamino-6-tert.butylamino-s-triazine can be obtained by recrystallisation of the active substance mixtures from certain solvents, by caking (sintering) with or without addition of liquids, and by fusing of the active substance mixtures and recrystallisation. The intermolecular compounds exist only in the solid crystalline state. On melting or dissolving they decompose again into the separate components.

The composition of the individual intermolecular compounds is well-defined within the analytical limits of error, but does not necessarily correspond to an integral simple molar ratio.

The composition and properties of some intermolecular compounds forming constituents of the agent according to the invention are given below:

| | Component I | Component II | Per cent by weight | | M.P. (decomp. pt.) |
|---|---|---|---|---|---|
| | | | Comp. I | Comp. II | |
| 1. | 2-methylthio-4-ethylamino-6-tert.butylamino-s-triazine | 2-chloro-4-ethyl-amino-6-tert.butylamino-s-triazine | 82.5 | 17.5 | 108–109° |
| 2. | " | atrazine (2-chloro 4-ethylamino-6-isopropylamino-s-triazine) | 81.5 | 18.5 | 94–100° |
| 3. | " | 2-chloro-4-ethyl-amino-6-sec.butyl-amino-s-triazine | 83.0 | 17.0 | 100–102° |
| 4. | " | 2-(4-chloro-6-ethyl-amino-1,3,5-triazin-2-yl-amino)-2-methyl-propionitrile | 84.0 | 16.0 | 106° |

The compounds have a melting point or decomposition point somewhat deviating from the low melting component I (M.P. 101°–107°C).

As already mentioned, component I forms also with mixtures of two or more asymmetrical chlorotriazines a single intermolecular compound, in which the asymmetrical chlorotriazines can be completely or partially interchanged.

Used for the characterisation of the preparations with X-ray powder methods were, on the one hand, Guinier diagrams and, on the other hand, Goniometer recordings. The Guinier diagrams were recorded with monochromatic Cuk$\alpha$-radiation, whereby ammonium alum was used as an external standard in an adjacent preparation chamber. The measured d-values were corrected by means of the ammonium alum lines with the aid of a programme, developed for this purpose, on the PDP-8/i small computer; the estimated accuracy is 1%.

For the intensity determination were used the values obtained with a Philips goniometer. The measuring velocity was 1/8° (2θ)/min; Cuk$\alpha$-radiation with Ni-filter and proportional counter were used. The graduation of the intensities were according to Anglo-American practice; $s$ = strong, $w$ = weak, $v$ = very, $m$ = medium. ($d$ = doublet).

| Component I | | Component II.1 | | Component II.2 | |
|---|---|---|---|---|---|
| d-values | Intensity | d-values | Intensity | d-values | Intensity |
| 10,13 | vw | 7,21 | vs | 8,24 | vw |
| 7,52 | vs | 6,87 | vw | 6,99 | vs |
| 6,36 | mw | 6,16 | vw | 5,73 | w |
| 5,85 | mw | 5,94 | vw | 5,35 | vw |
| 5,72 | vs | 5,66 | vw | 4,93 | s |
| 5,14 | m | 5,49 | m | 4,67 | m |
| 4,64 | m | 5,10 | s | 4,54 | mn |
| 4,52 | ms | 4,97 | m | 4,44 | s |
| 4,31 | m | 4,84 | m | 4,33 | mw |
| 4,20 | m | 4,67 | m | 4,05 | mw |
| 4,12 | mw | 4,57 | vs | 3,876 | m |
| 3,986 | mw | 4,45 | m | 3,715 | ms |
| 3,858 | m | 4,27 | w | 3,631 | vw |
| 3,750 | m | 4,18 | vw | 3,423 | mw |
| 3,573 | w | 4,08 | vw | 3,313 | w |
| 3,392 | s | 4,018 | m | 3,191 | w |
| 3,232 | vw | 3,944 | w | 3,110 | mw |
| 3,087 | w | 3,859 | w | 3,062 | w |
| 3,029 | vw | 3,789 | m | 2,990 | w |
| 2,940 | vw | 3,608 | w | 2,749 | vw |
| 2,815 | vw | 3,455 | vw | 2,713 | vw |
| 2,629 | vw | 3,404 | vw | 2,563 | vw |
| 2,541 | vw | 3,357 | w | 2,272 | vw |
| | | 3,275 | w | | |
| | | 3,227 | m | | |
| | | 3,159 | m | | |
| | | 3,114 | w | | |
| | | 3,082 | w | | |
| | | 2,984 | vw | | |
| | | 2,950 | vw | | |
| | | 2,831 | vw | | |
| | | 2,664 | vw | | |
| | | 2,553 | vw | | |
| | | 2,468 | vw | | |

| Component II. 4 | | Intermolecular compound | |
|---|---|---|---|
| d-values | Intensity | d-values | Intensity |
| 7,24 | vs | 10,47 | w |
| 6,24 | w | 9,78 | w |
| 5,80 | w | 7,94 | m |
| 5,24 | s | 7,55 | w |
| 5,00 | m | 6,53 | s |
| 4,89 | m | 5,28 | m |
| 4,77 | m | 4,88 | w |
| 4,63$^5$ | vs | 4,68 | w |
| 4,23 | mw | 4,32 | vs |
| 3,879 | mw | 3,962(d) | m |
| 3,801 | mw | 3,626 | w |
| 3,639 | w | 3,372(d) | w |
| 3,414 | mw | 3,260 | w |
| 3,33 | mw | 2,986 | m |
| 3,30 | m | 2,522 | vw |
| 3,222 | m | 2,494 | vw |
| 3,177 | m | | |
| 3,10 | m(s) | | |
| 3,03 | m | | |
| 2,78 | w | | |

The X-ray structural analysis produces for the intermolecular compounds an X-ray diagram which is completely different from that for the starting components, a fact which proves that the intermolecular components possess a different crystal structure from that of the starting components. Independently of the asymmetrical chlorotriazine used, the same X-ray diagram is always obtained, which is therefor dependent only on the methylthio-butylamino-s-triazine.

On the basis of this phenomena, of the composition, and of the uniform X-ray diagram, it can be assumed that with regard to the intermolecular compounds to be used according to the invention it is a case not of molecular compounds but of inclusion compounds. According to Klages, Lehrbuch der organ. Chemie II, 2. Edition (page 433) (Text book of organic Chemistry II), these compounds can also be described as mixed crystallisates.

For the production of these intermolecular compounds for the purpose of their incorporation into the agents according to the invention, the slowly (over weeks) occurring formation from solid mixtures of the individual components, which is responsible for the instability of these mixtures, is naturally not a practical proposition, although the production and separation of the intermolecular compounds in this manner is of course possible.

For practical purposes, the following methods are applicable as production methods for such "inclusion compounds": production from the melt, production by recrystallization, and production by caking (sintering) (P. Pfeiffer, "Organische Molekülverbindungen," 1927) ["Organic molecular compounds", 1927].

The present type of compound does not, however, correspond to the analogous compound type described in the literature; and cannot be produced simply by the stated processes. Quite specific conditions have to be observed.

Production from the melt

If 2-methylthio-4-ethylamino-6-tert.butylamino-s-triazine (component I) and one or more asymmetric chlorotriazines are fused together and the melt allowed to crystallise, then a mixture of I and the corresponding chlorotriazine is obtained. Surprisingly, it has been found that with slow cooling and inoculation, or crystallisation just below the melting point, the intermolecular compound can indeed be produced by the fusing together process.

To achieve this result, 10 to 99 parts of component I and 90 – 1 parts of asymmetrical chlorotriazines are heated to 110°– 150°C; the mass is thoroughly stirred, then cooled rapidly to 100°C(10°C/min.), and afterwards at a rate of 0.01°– 0.2°C per minute. After 10 minutes to 1 hour are added 0.01 – 10 parts of seed crystals from the intermolecular compound (which are prepared by caking (sintering), melting or recrystallisation). After crystallisation is obtained a crystal block which contains, depending on the starting concentration, the intermolecular compound alone, to the extent of 95 – 100%, or, if a component has been added in excess, the corresponding amounts of compound and a starting component.

Instead of slow cooling, it is also possible to cool rapidly to a temperature of between 90° and 100°C, and then to hold the melt at this temperature until complete crystallisation has occurred. In order to accelerate crystallisation, 0.01 – 10 parts of seed crystals can be added after ¼–1 hour, but even without inoculation the intermolecular compound is obtained in this case. The thus obtained crystal block is then reduced mechanically, and then ground preferably in an impact mill (or in an equivalent mill). The obtained fine powder can be processed to produce a wettable powder containing one or more carriers, dispersing agents and wetting agents; or a liquid paste containing wetting agents, dispersing agents, thickeners and a liquid carrier (mineral oil or water).

Since component I is obtained in large-scale commercial processes as a melt, and can be crystallised in a ball-mill, the following procedure can be used for high tonnages. The asymmetrical chlorotriazines are dissolved at 110°– 150°C in liquid 2-methylthio-4-ethylamino-6-tert.butylamino-s-triazine. The ball-mill is in the meantime charged with the solid intermolecular compound, and heated to 45°– 65°C.

The melt is fed into the ball-mill at the top end in such a manner that the mill contains 0.5 – 5% of melt and 95 – 99.5% solid material; and at the lower end of the mill is then drawn off the corresponding amount of crystallised intermolecular compound. The obtained powder, which consists to the extent of over 90% of the compound, can be processed direct, or after a pre-grinding in an impact mill, to obtain a wettable powder or a liquid paste.

Production by recrystallisation

In the case of recrystallisation of mixtures of 2-methylthio-4-ethylamino-6-tert.butylamino-s-triazine and asymmetrical chlorotriazines from solvents such as petroleum ether, low-boiling aliphatic or aromatic hydrocarbons (chlorinated hydrocarbons), only the starting materials are obtained, not, however, the intermolecular compound. On the other hand, if certain solvents are used such as nitriles, amides, alcohols or ketones, or mixtures thereof with hydrocarbons, and the starting components somewhat sintered together beforehand, then the intermolecular compounds can be produced in the pure form. Recrystallisation can be carried out in the usual manner by dissolving the two components, most favourably in the ratio of 75 – 85% of component I and 25 – 15% of chlorotriazine, in the solvent concerned at boiling temperature, allowing the solution to cool, filtering off the precipitated crystals, and drying them. They can be processed, either direct or after preliminary grinding in an impact mill, or in equivalent mills, into the form of pastes or wettable powders, whereby adjustment is made to the desired content by addition of component I or chlorotriazine.

Production by caking (sintering)

The two active substances, preferably in the pre-ground state, are mixed as homogeneously as possible in a specific quantitative proportion in a suitable mixer. The mixture is subsequently maintained, with continuous circulation, for a definite period of time at a specific elevated temperature. The mixture, which consists of a more or less coarse crystallisate, is then allowed to cool to room temperature, preferably whilst the mixer rotates. Caking (sintering) time and temperature need to be so adjusted that the intermolecular compound, after completion of the operation, constitutes a proportion in the reaction mixture of at least 90%, i.e., so that the reaction proceeds as far as possible quantitatively. The compound is afterwards finely ground, e.g. in an impact mill, and then converted with the addition of the still missing amount of the second active substance, as well as the other composition auxiliaries, into a homogeneous mixture, which is ultimately finely ground in a suitable mill, e.g. in an impact mill. A heatable mixer, such as, e.g. the Venuleth mixer, is suitable for the production of the intermolecular compound.

Preparation of the intermolecular compound by caking has proved in most cases in practice to be most successful when the caking (sintering) is effected with simultaneous circulation. An examination of the reaction kinetics, and of the ideal temperature and time values, has shown that yields of intermolecular compound, e.g. between component I and 2-chloro-4-ethylamino-6-tert.butylamino-s-triazine, of 90% and more can be obtained at a temperature of 50°C and a reaction time of several days, or at temperatures of 80° to 90°C and with a reaction time of 2 to 30 hours. For the effecting of caking during stirring, temperatures of 80°– 90°C for 8 hours have hitherto proved to be most favourable.

It has also been possible to accelerate the formation of the intermolecular compound using the caking method by additions of polar solvents. Mentioned as such reaction activators are, e.g. toluene, acetonitrile, N-methyl-2-pyrrolidone, dibutylphthalate and dimethylformamide, which, when added in amounts of 0.1 to 10 per cent by weight, clearly reduce the reaction time at a given temperature. Thus, with an addition of 5% of dimethylformamide at 65°C, a reaction time of only 1 hour was requried to obtain a yield of over 90% of intermolecular compound from 2-methylthio-4-ethylamino-6-tert.butylamino-s-triazine and 2-chloro-4-ethylamino-6-tert.butylamino-s-triazine. With 5% of dimethylformamide added at 80°C, a reaction time of only 30 minutes sufficed to obtain a yield of over 90%.

The addition of such reaction accelerators is especially advisable in the production of such intermolecular compounds the formation of which, under normal conditions, occurs more slowly, e.g. in the case of intermolecular compounds containing atrazine as the 2-chloro-s-triazine component, since the reaction in this case proceeds, under normal conditions, particularly slowly.

The production of the intermolecular compounds is further described in the following examples. These are followed by examples for the production of stable agents according to the invention (wettable powders and suspension concentrates) with use of the intermolecular compounds as active substances. The term 'parts' denotes parts by weight, and the temperatures are given in degrees Centigrade.

EXAMPLE 1 a. 820 g of 2-methylthio-4-ethylamino-6-tert.butylamino-s-triazine and 180 g of atrazine are heated in a 2-litre beaker to 120° and thoroughly stirred. The temperature is lowered to 90° and held there for 4 hours. The formed crystal block is removed from the beaker, reduced in a chopping apparatus, and then finely ground in an impact mill. The obtained powder consists to the extent of over 90% of the intermolecular compound, and can be processed to obtain the desired formulation.

b. In a heated 1000-litre vessel, 490 kg of 2-methylthio-4-ethylamino-6-tert.butylamino-s-triazine and 110 kg of 2-chloro-4-ethylamino-6-tert.butylamino-s-triazine are melted at 110°. An amount of 20 kg of already crystallised intermolecular compound is placed into a 1 metre long ball-mill (diametre 0.8 m) and heated to 50°. The ball-mill is maintained at this temperature and charged with the melt. The addition of the melt at one end of the ball-mill and the removal of the crystallised compound are so arranged that the throughput per hour is 150 kg of mixture. A coarsely granular powder is thus obtained consisting to the extent of more than 90% of the intermolecular compound; it can be processed, after fine grinding or direct, to obtain the desired preparations.

c. An amount of 410 kg of 2-methylthio-4-ethylamino-6-tert.butylamino-s-triazine is melted at 120°C in a heated 1,000 litre vessel. In the obtained melt are then dissolved 90 kg of 2-chloro-4-ethylamino-6-isopropylamino-s-triazine. The homogeneous melt is cooled to 105° – 110°C, and 10 kg of the solid intermolecular compound of the two s-triazines are stirred, as inoculating nuclei, into the melt. After inoculation, the melt is transferred to containers of at least 100 kg (e.g. fibre drums, steel drums or paper sacks). The containers are allowed to stand at room temperature, so that the melt cools sufficiently slowly for the intermolecular compound to form. The material is removed from the container after 1 – 3 days. Thus obtained is a crystal block consisting to the extent of more than 90% of the intermolecular compound, and which can be processed, by pre-crushing and grinding, to obtain the desired preparation.

EXAMPLE 2 a. 80 g of 2-methylthio-4-ethylamino-6-tert.butylamino-s-triazine and 20 g of 2-(4-chloro-6-ethylamino-1,3,5-triazin-2-yl-amino)-2-methylpropionitrile are dissolved in 200 g of methanol with boiling. Crystals form on cooling which contain 16.5% of 2-(4-chloro-6-ethylamino-1,3,5-triazin-2-yl-amino)-2-methylpropionitrile and 83.5% of 2-methylthio-4-ethylamino-6-tert.butylamino-s-triazine, and which consist of a pure intermolecular phase. After filtration under suction and drying are obtained 60 g of crystals (melting point 106°, X-ray diagram without secondary lines).

b. 85 g of 2-methylthio-4-ethylamino-6-tert.butylamino-s-triazine and 15 g of 2-chloro-4-ethylamino-6-tert.butylamino-s-triazine are heated dry at 65° for 24 hours in a glass vessel, and then dissolved at 50° in 750 g of acetonitrile. The solution is allowed to cool slowly and, after several hours' standing, large rhombic-like crystals are obtained. They contain 17.5% of 2-chloro-4-ethylamino-6-tert.butylamino-s-triazine and 82.5% of 2-methylthio-4-ethylamino-6-tert.butylamino-s-triazine, and have a decomposition point of 109°.

c. 80 g of 2-methylthio-4-ethylamino-6-tert.butylamino-s-triazine and 20 g of atrazine are dissolved in 250 g of a mixture of 50% of hexane and 50% of acetone at the boiling point; the solution is then allowed to cool. After filtration under suction and drying of the 40 g of formed crystals containing, according to the X-ray diagrams, more than 90% of intermolecular compound, the obtained compound can be processed direct, or after preliminary grinding, to obtain the desired preparation.

EXAMPLE 3

Into a 450 litre paddle drier heated to 80° and having a rotary speed of 10 revolutions per minute are placed 120 kg of 2-methylthio-4-ethylamino-6-tert.butylamino-s-triazine and 26.3 kg of 2-chloro-4-ethylamino-6-tert.butylamino-s-triazine. After 8 hours' circulating time is obtained a lumpy, coarse-crystalline product which consists to the extent of over 90% of the intermolecular compound, and which can be processed, after a preliminary grinding, in the usual manner to obtain a wettable powder.

EXAMPLE 3a

If atrazine (2-chloro-4-ethylamino-6-isopropylamino-s-triazine) is used as the chlorotriazine component, with the procedure otherwise as described in Example 3, then a yield of 90% and more of intermolecular compound is obtained only after a caking time of more than 1 week.

If the same reaction with atrazine at 80° is performed, however, in the presence of 5 per cent by weight of dimethylformamide, a yield of the intermolecular compound of more than 90% is obtained after only 4 hours reaction time. The addition of dimethylformamide is effected by the spraying of it into the active substance mixture (82.5% by weight of component I and 17.5% by weight of atrazine) as the mixer rotates.

Production of stable preparations

In the following examples the active substances used are denoted by the following Roman numerals:

I = 2-methylthio-4-ethylamino-6-tert.butylamino-s-triazine

II = 2-chloro-4-ethylamino-6-tert.butylamino-s-triazine

III = 2-chloro-4-ethylamino-6-isopropylamino-s-triazine

IV = 2-(4-chloro-6-ethylamino-1,3,5-triazin-2-yl-amino)-2-methylpropionitrile

EXAMPLE 4 a. 50 Parts of a crystallised melt containing 85% of intermolecular compound between I and II and 15% of compound II are pre-ground in an impact mill, and then mixed with the following additives in a Drais-mixer:

5 parts of Tinovetin B (sodium dibutylnaphthalene sulphonate), 5 parts of dispersing agent H (aromatic sulphosulphonic acid condensed with formaldehyde, ammonium salt), 0.7 parts of Eriopon GO (alkyl glycol ether sulphonate, sodium salt), 2.8 parts of magnesium carbonate, 7.0 parts of Celite FC (purified kieselguhr), 12.0 parts of Champagne chalk, 17.5 parts of kaolin.

The mixture is finely ground in an impact mill. A wettable powder A is obtained which contains in all 15% of active substance II and 35% of active substance I, and which, compared to a powder B produced from the starting components without prior conversion into an intermolecular compound, shows no increase in the amount of wet-sieve residue, and is therefore stable.

| | Wet-seive residue after storage | | | | |
|---|---|---|---|---|---|
| | immediately | 1 week/ 50° | 4 weeks/ 50° | 8 weeks/ 50° | 1 week/ 65° | 4 weeks/ 65° |
| Powder A | 0.3% | 0.1% | 0.0% | 0.1% | 0.2% | 0.0% |
| Powder B | 0.0% | 21.2% | 11.7% | 12.3% | 10.4% | 20.1% |

Powder A: produced with intermolecular compound.
Powder B: produced with the two separated triazines.

b. 48.5 Parts of a crystallised melt consisting of 82.5% of I and 17.5% of II, i.e. of practically 100% of intermolecular compound, are finely ground in an impact mill, and the mixed together with the following additives in a mixer:

1.5 parts of active substance II, finely ground, 5.0 parts of Tinovetin B (sodium dibutylnaphthalene sulphonate), 5.0 parts of dispersing agent H (ammonium salt of aromatic sulphosulphonic acid condensed with formaldehyde), 0.8 parts of Eriopon GO (sodium alkyl glycol ether sulphonate 12.0 parts of Champagne chalk, 17.5 parts of kaolin.

The mixture is finely ground in an impact mill. The thus obtained wettable powder A is stable, and shows no increase in the wet-sieve residue on storage.

|  | Wet-sieve residue after storage | | | | | |
|---|---|---|---|---|---|---|
|  | immediately | 1 week/ 50° | 4 weeks/ 50° | 8 weeks/ 50° | 1 week/ 65° | 4 weeks/ 65° |
| Powder A | 0.3% | 0.1% | 0.0% | 0.1% | 0.2% | 0.0% |
| Powder B | 0.1% | 15.0% | 14.5% | 14.0% | 3.4% | 21.0% |

Powder A: produced with intermolecular compound.
Powder B: produced with the two separated triazines.

In an analogous manner were produced the following stable preparations containing an intermolecular compound obtained by caking (Examples 3 and 3a):

EXAMPLE 5

48.5% of an intermolecular compound consisting of 82.5% of active substance I and 17.5% of active substance II, 1.5% of active substance II, 5.0% of sodium dibutylnaphthalene sulphonate, 5.0% of a mixture of aromatic sulphonic acid condensed with formaldehyde, ammonium salt, 0.8% of sodium salt of a sulphonated hexadecyl glycol ether, containing ca. 2 moles of ethylene oxide, 3.2% of magnesium carbonate, precipitated, 8.0% of chalk, 8.0% of purified kieselguhr, 20.0% of kaolin.

The wet-sieve residue of this preparation on the 44 μ sieve was 0% even after 6 weeks' storage at 65°.

The wet-sieve residue is determined as follows:

An amount of 20 g of stored samples is mixed with ca. 100 ml of tap water and with 10 ml of a solution containing 20 g of sodium dibutylnaphthalene sulphonate per 500 ml of tap water to obtain a smooth paste. The paste is allowed to stand for 15 minutes, and is afterwards diluted with 100 ml of tap water to form an as homogeneous a suspension as possible.

The whole of the suspension is poured into the sieving apparatus (44 μ sieve). The wet-sieve residue (> 44 μ) is then connected to the water supply; water of 1 atm. pressure is allowed to wash through the sieve until the water running off is free of suspension particles which have been washed through; in any case, however, the water is allowed to flow through for at least 2 minutes.

After the apparatus has been opened, the residue remaining behind on the sieve is dried.

EXAMPLE 6

42.4% of intermolecular compound consisting of 82.5% of active substance I and 17.5% of active substance II, 7.6% of active substance II, 5.0% of sodium dibutylnaphthalene sulphonate, 5.0% of a mixture of aromatic sulphonic acid condensed with formaldehyde, ammonium salt, 0.7% of sodium salt of a sulphonated hexadecyl glycol ether containing ca. 2 moles of ethylene oxide, 2.8% of magnesium carbonate, precipitated, 7.0% of purified kieselguhr, 12.0% of chalk, 17.5% of kaolin.

In this case too, the wet sieve residue after 4 weeks' storage at 65° was still 0%.

EXAMPLE 7

48.5% of intermolecular compound consisting of 82.5% of active substance I and 17.5% of active substance II, 1.5% of active substance II, 15.0% of a mixture containing 33.3% of chalk, 33.3% of sodium dibutylnaphthalene sulphonate and 33.4% of a mixture of aromatic sulphosulphonic acids condensed with formaldehyde, ammonium salt, 35.0% of chalk.

Wet-sieve residue after 2 weeks' storage at 65° : 0%.

EXAMPLE 7a 47.5% of intermolecular compound consisting of 84.0% of active substance I and 16.0% of active substance IV, 2.5% of active substance IV, 15.0% of a mixture containing 33.3% of chalk, 33.3% of sodium dibutylnaphthalene sulphonate and 33.4% of a mixture of aromatic sulphosulphonic acids condensed with formaldehyde, ammonium salt, 35.0% of chalk.

Wet-sieve residue after 2 weeks' storage at 65° : 0%.

EXAMPLE 8

66.7% of intermolecular compound consisting of 82.5% of active substance I and 17.5% of active substance II, 13.3% of active substance II, 15.0% of a mixture containing 33.3% of chalk, 33.3% of sodium dibutylnaphthalene sulphonate and 33.4% of a mixture of aromatic sulphosulphonic acids condensed with formaldehyde, ammonium salt, 5.0% of chalk.

Wet-sieve residue after 2 weeks' storage at 65° : 0%.

EXAMPLE 8a 49.3% of intermolecular compound consisting of 82% of active substance I and 18% of active substance III, 31.5% of active substance III, 5.0% of sodium dibutylnaphthalene sulphonate, 5.0% of aromatic sulphosulphonic acid condensed with formaldehyde, ammonium salt, 1.0% of sodium-N-methyl-N-oleoyl-tauride, 8.2% of highly dispersed, precipitated and ground silicic acid.

Wet-sieve residue on the 44 μ sieve after 2 months' storage at 50°C : 0%.

If the compositions of Examples 5 to 8 are produced, instead of with intermolecular compounds, with the active substances as such in the stated quantitative proportions, then the wet-sieve residue on the 44 μ sieve after a storage time of 2 to 3 weeks at 65° is in every case at least 30%, which is proof of the high level of storage instability.

EXAMPLE 9

(suspension concentrate)

The intermolecular compound between active substance I and active substance II used in this example is produced by caking as follows:

In a heatable mixer for pulverulent products, the following constituents are mixed to obtain a homogeneous mixture:

94 parts of active substance I, pre-ground in an impact mill
20 parts of active substance II, pre-ground in an impact mill.

The obtained mixture is then maintained, in a rotating mixer, at 85° for at least 10 hours. The mixture is subsequently allowed to cool to room temperature as the mixer rotates.

The solidified reaction mixture, containing at least 90% of the intermolecular compound of I with II, is afterwards finely ground in an impact mill, or in some other suitable mill.

a. In a suitable mixer for liquid products, the following constituents are dissolved in:
560.5 parts of tap water at room temperature:
27.0 parts of potassium chloride,
5.0 parts of a water soluble biopolymer (e.g. polysaccharide gum; Polytran FS of the Pillsbury Company),
135.0 parts of ethylene glycol (antifrost agent),
28.0 parts of Triton X 100 (alkylphenyl polyethylene glycol) as wetting agent,
1.5 parts of Dowicide G (pentachlorophenol sodium salt, as preserving agent),
also added were:
5.5 parts of an antifoam agent (Antifoam A).
To this solution are added with stirring:
114 parts of the finely ground reaction mixture produced as given above and consisting of 94 parts of I and 20 parts of II in the form of the intermolecular compound,
28.5 parts of active substance II, pre-ground,
95.0 parts of 2-methoxy-4-ethylamino-6-tert.butylamino-s-triazine.

The obtained liquid paste is finely ground in a ballmill (e.g. Perlmill or Dyno-Mill) with glass balls of 1–2 mm diametre until the particle size of the active substances is, to the extent of at least 95%, below 2.5 $\mu$.

After a storage of the suspension concentrate in a sealed glass bottle for 1 month at 20° and at 50°, the physical properties remained practically unchanged, i.e., only negligible sedimentation could be observed, and the particle size of the active substances had changed only very slightly.

b. If the above composition is produced, not using the intermolecular compound from I and II, but using a mixture of 94 parts of I, 48.5 parts of II, and 95 parts of 2-methoxy-4-ethylamino-tert.butylamino-s-triazine as the third addition component, then an unstable product is obtained exhibiting a rapid growth of the particle size of the crystals, and pronounced sedimentation, during storage.

Whereas in the case of the product produced according to the invention and given in Example 9a only 60 (before storage: 20) of 1,000 particles had, after 1 month's storage at 20°, a particle size of 10 $\mu$ and above, the corresponding number in the case of the unstable mixture according to Example 9b was 200 particles (before storage : 40) out of 1,000 with a particle size of 10 $\mu$ and more after 1 month's storage at 20°.

c. 28.3% of intermolecular compound consisting of 82.5% of active substance I and 17.5% of active substance II,
18.4% of active substance II,
10.0 % of ethylene glycol (antifrost agent),
3.0% of alkylphenyl polyethylene glycol (wetting agent),
0.5% of sodium-N-methyl-N-oleoyl-tauride (wetting agent),
0.5% of a biopolymer, e.g. Polytran FS of the firm Pillsbury Co. (thickening agent),
0.6% of an antifoam agent, e.g. Antifoam Y-30,
0.1% of a preserving agent, e.g. Dowicide G, and
38.6% of tap water.

After a storage of the suspension concentrate in a closed glass bottle for 12 weeks at 50°C and for 8 months at room temperature, the physical properties remained practically unchanged, i.e., no noticeable sedimentation could be observed, and the particle size of the active substances was unchanged.

d. 28.2% of intermolecular compound consisting of 82% of active substance I and 18% of active substance III,
18.1% of active substance III,
5.0% of ethylene glycol (antifrost agent),
3.5% of alkylbenzenesulphonate-amine salt derivative (wetting agent),
1.0% of sodium-N-methyl-N-oleoyl-tauride (wetting agent),
0.5% of a biopolymer, e.g. Polytran FS of the firm Pillsbury Co. (thickening agent),
0.8% of an antifoam agent, e.g. Antifoam Y-30,
0.1% of a preserving agent, e.g. Dowicide G, and
42.8% of tap water.

After a storage of the suspension concentrate in a closed glass bottle for 12 weeks at 50°C and for 8 months at room temperature, the physical properties remained practically unchanged, i.e., no noticeable sedimentation could be observed, and the particle size of the active substances was unchanged.

We claim:

1. A process for producing an intermolecular compound of (A) 2-methylthio-4-ethylamino-6-tert.butylamino-s-triazine and (B) one or more asymmetrically substituted chlorotriazines selected from the group consisting of 2-chloro-4-ethylamino-6-tert.butylamino-s-triazine, 2-chloro-4-ethylamino-6-sec.-butylamino-s-triazine, 2-chloro-4-ethylamino-6-(2'-cyanopropyl-(2')-amino)-s-triazine and 2-chloro-4-ethylamino-6-isopropylamino-s-triazine, which process comprises the steps of (1) heating from 10 to 99% by weight of (A) and from 90 to 1% by weight of (B) to a temperature of about 110°–150°C to obtain a molten mass, (2) rapidly cooling the molten mass to a temperature of about 100–110°C at a cooling rate of 10°C per minute, (3) slowly cooling the molten mass at a cooling rate of about 0.01°–0.2°C per minute, (4) seeding the molten mass with crystals of the intermolecular compound and (5) allowing the mass to stand until a crystal block of the intermolecular compound is obtained.

2. A process for producing an intermolecular compound of (A) 2-methylthio-4-ethylamino-6-tert.butylamino-s-triazine and (B) one or more asymmetrically substituted chlorotriazines selected from the group consisting of 2-chloro-4-ethylamino-6-tert-.butylamino-s-triazine, 2-chloro-4-ethylamino-6-sec.-butylamino-s-triazine, 2-chloro-4-ethylamino-6-(2'-cyanopropyl-(2°)-amino)-s-triazine and 2-chloro-4-ethylamino-6-isopropylamino-s-triazine, which process comprises the steps of (1) heating from about 10 to 99% by weight of (A) and from 90 to 1% by weight of (B) to a temperature of about 110°–150°C to obtain a molten mass, (2) rapidly cooling the molten mass at a cooling rate of about 10°C per minute to a temperature of about 90°–100°C, said temperature being below the melting point of the intermolecular compound, and (3) maintaining said temperature until complete crystallization occurs.

3. A process for producing an intermolecular compound of (A) 2-methylthio-4-ethylamino-6-tert-.butylamino-s-triazine and (B) one or more asymmetrically substituted chlorotriazines selected from the group consisting of 2-chloro-4-ethylamino-6-tert-.butylamino-s-triazine, 2-chloro-4-ethylamino-6-sec.-butylamino-s-triazine, 2-chloro-4-ethylamino-6-(2'-cyanopropyl-(2')-amino)-s-triazine and 2-chloro-4-ethylamino-6-isopropylamino-s-triazine, which process comprises the steps of (1) dissolving from 75–85% by weight of (A) and 25–15% by weight of (B) in a solvent selected from the group consisting of nitriles, amides, alcohols, ketones or mixtures thereof at the boiling temperature of said solvent and (2) allowing the resultant solution to cool, thereby causing the formation of crystals of the intermolecular compound.

4. A process for producing an intermolecular compound of (A) 2-methylthio-4-ethylamino-6-tert-.butylamino-s-triazine and (B) one or more asymmetrically substituted chlorotriazines selected from the group consisting of 2-chloro-4-ethylamino-6-tert-.butylamino-s-triazine, 2-chloro-4-ethylamino-6-sec.-butylamino-s-triazine, 2-chloro-4-ethylamino-6-(2'-cyanopropyl-(2')-amino)-s-triazine and 2-chloro-4-ethylamino-6-isopropylamino-s-triazine, which process comprises the steps of (1) mixing solid particles of (A) and (B) at a temperature of between about 50° and 90°C to form a mixture and (2) maintaining said mixture at said temperature with continuous stirring whereby the intermolecular compound is produced in sintered form.

5. A process according to claim 4 in which the temperature is from 80° to 90°C.

6. A process for producing an intermolecular compound of (A) 2-methylthio-4-ethylamino-6-tert-.butylamino-s-triazine and (B) one or more asymmetrically substituted chlorotriazines selected from the group consisting of 2-chloro-4-ethylamino-6-tert-.butylamino-s-triazine, 2-chloro-4-ethylamino-6-sec.-butylamino-s-triazine, 2-chloro-4-ethylamino-6-(2'-cyanopropyl-(2')-amino)-s-triazine and 2-chloro-4-ethylamino-6-isopropylamino-s-triazine, which process comprises the steps of mixing solid particles of (A), (B) and from about 0.1 to 10% by weight of a polar solvent at a temperature of between 50° and 90°C to form a mixture and (2) maintaining said mixture at said temperature with continuous stirring, whereby the intermolecular compound is produced in sintered form.

7. A process according to claim 6 in which the temperature is from 80° to 90°C.

* * * * *